Aug. 8, 1944.    G. R. RADLEY ET AL    2,355,557
CONTROLLER FOR ELECTRIC MOTORS
Filed Jan. 23, 1943

Inventors
Guy R. Radley
Edwin W. Seeger
By Frank W. Hubbard
Attorney

Patented Aug. 8, 1944

2,355,557

UNITED STATES PATENT OFFICE 2,355,557

CONTROLLER FOR ELECTRIC MOTORS

Guy R. Radley, Whitefish Bay, and Edwin W. Seeger, Wauwatosa, Wis., assignors to Cutler-Hammer, Inc., Milwaukee, Wis., a corporation of Delaware Application January 23, 1943, Serial No. 473,308

10 Claims. (Cl. 172—179)

This invention relates to improvements in controllers for electric motors, and more particularly to reversing controllers of the so-called plugging or reverse current braking type.

Such controllers as heretofore designed have assumed various forms. A typical form for direct current motors comprises a plurality of steps of series resistance, electroresponsive switches to control such steps of resistance, electroresponsive switches for controlling the continuity of the motor circuit and also motor reversing connections and a master switch controlling all such electroresponsive switches to effect operation of the motor in either direction and establishment of reverse connections while the motor continues to rotate in the previously selected direction. The resistance controlling switches are commonly interlocked to necessitate response thereof in a predetermined order, the first responsive switch having some form of control whereby if while the motor is operating in one direction, reverse power connections are established for plugging, the first step of series resistance designed as a plugging resistance will be included in circuit subject to exclusion automatically when some predetermined condition occurs. It is important to insure inclusion of such first step of resistance while the voltage is high and it is equally important to insure ultimate response of its control switch to enable reacceleration of the motor in the reverse direction.

However, reliable automatic control of the switch controlling the special plugging step of resistance has presented difficulties, and the present invention has among its objects to afford the desired control through employment of very simple and very reliable means.

Another object is to provide automatic control means of the character stated which will be readily applicable to various present types of reversing controllers including controllers having means affording delayed action of the resistance controlling switches provided for acceleration of the motor.

Another object is to provide automatic control means of the character stated which may be easily adjusted for the desired action thereof and which has flexibility in respect of establishment of operative relation to the controller with which it is associated.

Another object is to provide control means of the character stated enabling employment of a plugging switch of that type having an operating winding and a holding or restraining winding through the medium of which response of the switch may be delayed.

Various other objects and advantages of the invention will hereinafter appear.

The accompanying drawing illustrates diagrammatically certain embodiments of the invention which will now be described, it being understood that the invention is suscepticle of embodiment in other forms falling within the scope of the appended claims.

In the accompanying drawing.

Figure 1:
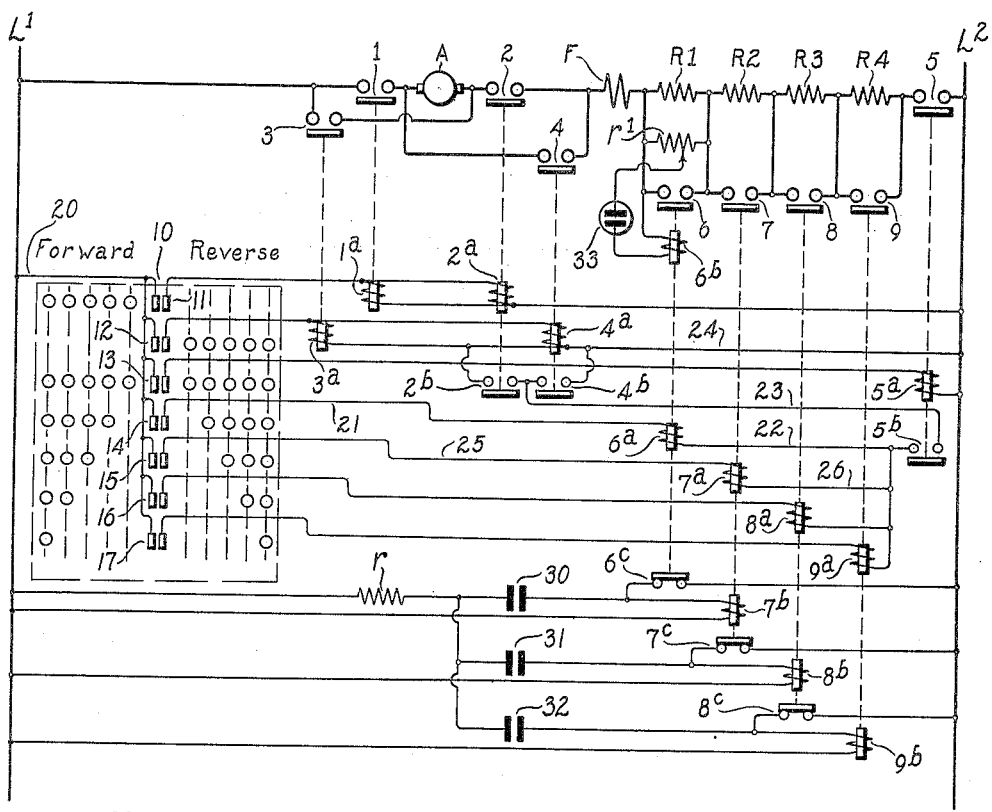
Figure 1 shows a controller embodying the invention in the form regarded at this time as the preferred form.

Referring to Fig. 1 of the accompanying drawing, the same illustrates diagrammatically a motor having an armature A and a series field winding F to be supplied from lines L1—L2 and to be controlled through the medium of series resistors R1, R2, R3 and R4. The resistor R1 constitutes a special resistance step for plugging, while resistors R2, R3 and R4 constitute the usual accelerating resistance, the number of steps of which may of course be varied as desired.

The electroresponsive switches for controlling the motor connections comprise reversing switches 1, 2, and 3, 4, and a main switch 5. The reversing switches 1 and 2, and main switch 5, as will be obvious, provide for connection of the motor armature and series field across lines L1 and L2 and for flow of current through both the motor armature and field winding from left to right. On the other hand, as will be obvious, the reversing switches 3 and 4 and main switch 5 provide for connection of the motor armature and series field winding across lines L1 and L2 and for flow of current through the motor armature from right to left, but from left to right through the motor field winding. The main switch 5 is of the normally open type having an operating winding 5a and normally disengaged auxiliary contacts 5b. The reversing switches 1, 2, 3 and 4 are also of the aforementioned type having operating windings 1a, 2a, 3a and 4a, respectively, and switches 2 and 4 are provided with normally disengaged auxiliary contacts 2b and 4b, respectively.

The resistance controlling means comprises normally open switches 6, 7, 8 and 9 respectively controlling short circuits for resistors R1, R2, R3 and R4. The switch 6 has an operating winding 6a, a holding or restraining winding 6b and normally engaged auxiliary contacts 6c. The switch 6 may in practice assume various forms, as for example the well known form comprising a contact carrying lever fulcrumed at an intermediate point to be subjected to opposing pulls by its operating winding and its holding or restraining winding to require deenergization of the latter winding before the former winding is effective to close the switch. The switches 7, 8 and 9 may be of the same type as the switch 6, being shown as respectively provided with operating windings 7a, 8a and 9a and with holding or restraining windings 7b, 8b and 9b. Switches 7 and 8 are also like switch 6 in having normally engaged auxiliary contacts 7c and 8c, respectively.

The operating windings of switches 6, 7, 8 and 9 as well as the operating windings of the main and reversing switches 1 to 5 are under the control of a master switch 10. The master switch 10 is shown as of conventional form comprising normally disengaged sets of contacts 11, 12, 13, 14, 15, 16 and 17, each set to be engaged in the positions of the master switch indicated by the dots in horizontal alignment with such sets of contacts. Thus for example the contacts 11 are engaged in all forward positions of the master switch but not in any reverse position of the master switch, whereas contacts 13 are engaged in all forward and reverse positions of the master switch, while contacts 17 are engaged only when the master switch is moved to its last forward position or its last reverse position. Contacts 11 when engaged connect across the line, in parallel, the windings 1a and 2a of reversing switches 1 and 2, while contacts 12 when engaged similarly connect across the line the windings 3a and 4a of reversing switches 3 and 4. Contacts 13 when engaged connect across the line the winding 5a of main switch 5, these connections being so obvious as to render tracing thereof needless. Contacts 14 when engaged establish circuit from line L1 by conductors 20 and 21, through the operating winding 6a of switch 6, by conductor 22, through the contacts 5b of main switch 5 when energized, by conductor 23, through the auxiliary contacts 2b of reversing switch 2 or the auxiliary contacts 4b of reversing switch 4 when one or the other of said reversing switches is energized, to conductor 24, and thence to line L2. Master switch contacts 15 when engaged complete circuit from conductor 20 by conductor 25, to and through the operating winding 7a of resistance switch 7, by conductor 26 to the auxiliary contacts of the main switch, and thence to line L2 as already traced. Master switch contacts 16 and 17, as will be obvious, respectively connect the operating windings 8a and 9a of resistance switches 8 and 9 in parallel to the operating winding of switch 7. Also as will be obvious the master switch provides for establishing the circuits for windings 6a, 7a, 8a and 9a sequentially in the order named for acceleration and for braking the circuits of said windings in an inverse order for deceleration and plugging.

Sequential response of the resistance switches is also necessitated by the circuit arrangement of their holding or restraining windings. As will be apparent, the lower terminal of each of the windings 7b, 8b and 9b is permanently connected to line L1, while the upper terminals of the windings 7b, 8b and 9b are connected to line L2 respectively through the auxiliary contacts 6c of switch 6, auxiliary contacts 7c of switch 7, and auxiliary contacts 8c of switch 8. These auxiliary contacts being normally closed the windings 7b, 8b and 9b are normally energized and so long as windings 7b, 8b and 9b are energized they restrain their respective switches against response. Thus it will be apparent that with each of the restraining windings controlled by the auxiliary contacts of the next preceding resistance switch their deenergization will be sequential, wherefore the response of their respective switches must be sequential. In practice it is often desirable to further delay deenergization of each of the holding windings 7b, 8b and 9b and to this end said windings have associated therewith respectively condensers 30, 31 and 32. Each condenser is connected between the upper terminal of its respective winding and line L1 through a resistor r, and thus each of the windings 7b, 8b and 9b is provided with a condenser shunt to delay decay of its magnetic flux and thus afford the same an inherently transient time element in releasing its respective switch after disconnection of the winding from line L2.

As hereinbefore indicated, the control, neglecting the plugging switch 6 and its control, is of a well known type, plugging being effected by throwing the master switch from a forward position to a reverse position, or vice versa. This deenergizes all resistance controlling switches for inclusion of all resistors R1 to R4 when plugging is initiated.

Referring now to the control of the plugging switch 6, its holding or restraining winding 6b is shown as being connected in shunt with a variable portion of a resistor r1 connected in parallel with the plugging resistor R1. While in practice the winding 6b might be connected across resistor R1 or a variable portion thereof it is deemed more practical to employ the resistance r1. The winding 6b so connected will thus be subjected to a voltage derived from and proportional to the voltage of the motor circuit and will be subject to adjustment by varying the tap of resistance r1 to which it is connected, and said winding has in series therewith a cold cathode glow discharge tube of any preferred form, as for example a neon glow lamp 33. As is well understood, such a tube becomes conducting only when subjected to a relatively high voltage, whereas its conductivity decreases rapidly with a reduction in voltage but continues pending reduction in voltage to a value substantially below that required to initiate conduction. For example, such a tube may be designed to become conducting at 80 volts and to become non-conducting upon voltage reduction to approximately 50 volts.

It will thus be apparent that with the motor operating in either direction quick throw-over of the master for reverse power connections resulting in reinclusion of resistors R1, R2, R3 and R4 will subject the circuit including the restraining winding 6b of switch 6 and the tube 33 to a high voltage, causing said tube to become conducting, and hence energizing winding 6b to restrain switch 6 against response. On the other hand, as the motor is slowed down as a consequence of plugging or reverse current braking, the voltage impressed upon tube 33 will decrease causing said tube to become less and less conductive and definitely non-conductive by the time the motor speed is reduced to zero. Thus the restraining winding 6b in series with tube 33 will be deenergized with certainty by the time the motor speed is reduced to zero, and as will be understood the switch 6 is at such time ready to respond to exclude the plugging resistance, its operating winding having been energized upon initiation of plugging. Moreover if so desired the switch 6 may be designed to be released for response upon mere reduction in conductivity of tube 33 and hence of the circuit of restraining winding 6b without awaiting interruption of current flow by the tube. The possibilities of effecting such earlier response of the switch 6 while accomplishing the desired delayed action thereof will be apparent from the characteristic curve shown in Fig. 3 and later described.

As will be understood, when switch 6 responds to exclude the plugging resistance following a quick reverse movement of the master switch it initiates reacceleration of the motor, assuming positioning of the master switch for response of one or more of the switches 7, 8 and 9. As previously explained response of switches 7, 8 and 9 is dependent upon prior response of switch 6 wherefore the importance of insuring against permanent locking out of switch 6 following plugging or in starting the motor from rest will be apparent, and the aforedescribed control of winding 6a insures against permanent locking out of switch 6 either upon plugging or in starting the motor from rest. In the latter case the voltage of the motor circuit is too low to render tube 33 conducting, wherefore winding 6b is not energized and switch 6 is free for immediate response.

Figure 2:
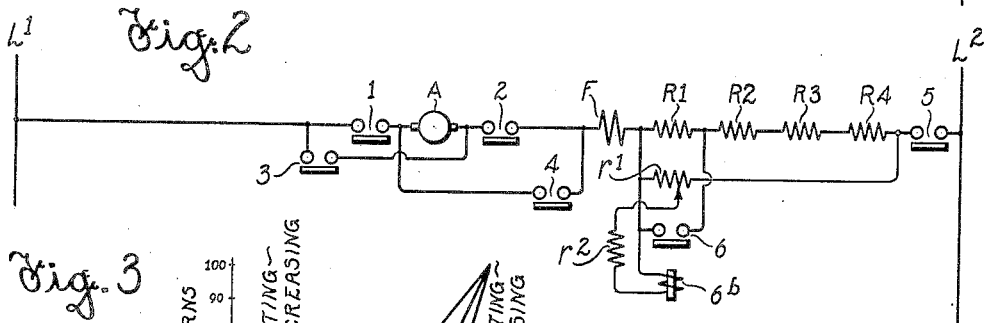
Fig. 2 shows a modification.

Referring to Fig. 2, the showing thereof is identical with a part of the showing of Fig. 1 except that in lieu of tube 33 the circuit of restraining winding 6b of switch 6 includes a resistor r2 of that type which decreases in resistance value with increase in the voltage to which it is subjected and vice versa, as for example the type of resistor known in the art as "Thyrite." As will be apparent, this type of resistor will have an effect on the winding similar to that of the tube 33 of Fig. 1 and will give the desired delayed action of switch 6 with protection against permanent locking out of said switch either upon plugging or in starting the motor from rest. However, the resistor r2 does not afford as positive protection as that afforded by the circuit interrupting characteristic of the tube, and hence necessitates more care in design and adjustment of the plugging switch to bring about its response as desired.

Figure 3:
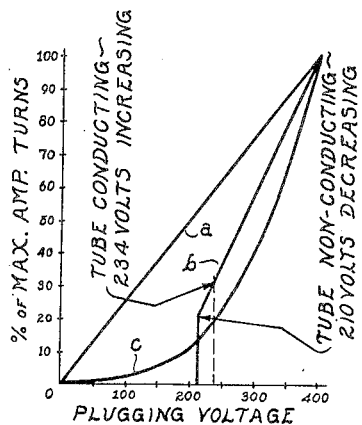
Fig. 3 shows certain characteristic curves.

Referring to Fig. 3, the same shows characteristic curves a, b and c, respectively, for a controller wherein the winding 6b is connected across a part of the motor resistance without a tube 33 or special resistor r2, for a controller of the type shown in Fig. 1 and for a controller of the type shown in Fig. 2. It will be noted that curves b and c are much alike and contrast to curve a very strikingly in respect of reduction in ampere turns during plugging, the tube 33 and resistor r2 effecting reduction in ampere turns to about 20% or less when normal line voltage is reached in contrast to the usual control providing less than 50% reduction. Thus even without the circuit interrupting characteristic of the tube, the tube control greatly simplifies the design and adjustment of the plugging switch for the desired actions thereof, and if it be intended to have the plugging switch respond substantially in advance of the tube becoming non-conducting and it fails to so respond because of misadjustment, then when the tube becomes non-conducting it effects release of the switch for response regardless of its misadjustment. As shown by curve c, the resistor r2 effects an even greater reduction in ampere turns as reduction to line voltage is approached, and hence reliable operation of the plugging switch following plugging is made possible. As shown by curve b the tube 33 does not become conducting on a rising voltage until after full line voltage is reached, whereas as shown by curve c resistor r2 enables such restriction of ampere turns at full line voltage that the switch 6 may easily be made responsive without delay in starting the motor from rest.

As will be understood, the automatic control set forth enables selection of the resistor with which the restraining winding of switch 6 and its control tube 33 or resistor r2 are associated, it being apparent that an operative relation is not limited to connection of resistor r1 across the plugging resistor R1. Thus as shown in Fig. 2 the resistor r1 may be connected across resistor R1 and additional series resistors, this connection being preferable where a resistor r2 is used in lieu of a tube.

Also it is to be understood that while the plugging control herein disclosed is shown as applied to a typical direct current system of control the same may be equally well applied to other systems either of direct current or alternating current type.

What we claim as new and desire to secure by Letters Patent is:

1. The combination with a reversing controller for electric motors affording plugging of the motor and comprising means functioning incidental to plugging to afford a given resistance of the plugging circuit, of means affording automatic control of the former means to maintain such given resistance for a temporary period and then to effect a predetermined reduction in such resistance prior to slowdown of the motor to zero speed, the second mentioned means comprising for governing its aforementioned resistance maintaining and reducing actions, current conducting means which varies in degree of conductivity, with variation in voltage and which is subjected to a voltage proportional to that of the plugging circuit, for reduction of its conductivity as plugging slows down the motor.

2. The combination with a reversing controller for electric motors affording plugging of the motor and comprising means functioning incidental to plugging to afford a given resistance of the plugging circuit, of means affording automatic control of the former means to maintain such given resistance for a temporary period and then to effect a predetermined reduction in such resistance prior to slowdown of the motor to zero speed, the second mentioned means comprising for governing its aforementioned resistance maintaining and reducing actions, current conducting means which varies in degree of conductivity, with variation in voltage and which is subjected to a voltage proportional to that of the plugging circuit, the last mentioned means becoming definitely non-conducting as a function of voltage drop incidental to slow down of the motor to zero speed.

3. The combination with a reversing controller for electric motors affording plugging of the motor and comprising means functioning incidental to plugging to afford a given resistance of the plugging circuit, of means affording automatic control of the former means to maintain such given resistance for a temporary period and then to effect a predetermined reduction in such resistance prior to slowdown of the motor to zero speed, the second mentioned means comprising for governing its aforementioned resistance maintaining and reducing actions current conducting means which varies in degree of conductivity with variation in voltage and which is subjected to a voltage proportional to that of the plugging circuit, current conducting means which is subjected to a voltage proportional to the voltage of the plugging circuit and which normally is non-conducting, remaining non-conducting pending increase in voltage to given value and then remaining conducting pending drop in voltage to a given lower value, said current conducting means also having the characteristic of affording within the range of voltage variation resulting from plugging substantially different degrees of conductivity for proportional changes in voltage.

4. The combination with a reversing controller for electric motors affording plugging of the motor and comprising means functioning incidental to plugging to afford a given resistance of the plugging circuit, of means affording automatic control of the former means to maintain such given resistance for a temporary period and then to effect a predetermined reduction in such resistance prior to slowdown of the motor to zero speed, the second mentioned means comprising for governing its aforementioned resistance maintaining and reducing actions current conducting means which varies in degree of conductivity with variation in voltage and which is subjected to a voltage proportional to that of the plugging circuit, a winding and in circuit therewith means which varies in degree of conductivity with variation in voltage and which during plugging is subjected to voltage variations proportional to the voltage variations of the plugging circuit.

5. The combination with a reversing controller for electric motors affording plugging of the motor and comprising means functioning incidental to plugging to afford a given resistance of the plugging circuit, of means affording automatic control of the former means to maintain such given resistance for a temporary period and then to effect a predetermined reduction in such resistance prior to slowdown of the motor to zero speed, the second mentioned means comprising for governing its aforementioned resistance maintaining and reducing actions current conducting means which varies in degree of conductivity with variation in voltage and which is subjected to a voltage proportional to that of the plugging circuit, a winding and in circuit therewith means which varies in degree of conductivity with variation in voltage and which during plugging is subjected to voltage variations proportional to the voltage variations of the plugging circuit, the last mentioned means being normally non-conducting but becoming conducting when the voltage of the plugging circuit is above a given value and remaining conducting pending reduction in voltage to a value below the aforementioned value but within the range of voltage variation incidental to slowdown of the motor to zero speed.

6. In a controller for electric motors, the combination with means to establish reverse power connections for the motor and to afford resistance for protection of the motor in starting and plugging thereof, of resistance varying means including a switch to effect after initiation of plugging and prior to slowdown of the motor to zero speed a predetermined reduction in resistance of the plugging connections, and further including current conducting means having at different voltages different degrees of conductivity, said switch having an operating winding and a restraining winding, the latter winding and said current conducting means being in series and having connections with the plugging circuit to be subjected to a voltage derived from and proportional to that of the plugging circuit.

7. In a controller for electric motors, the combination with means to establish reverse power connections for the motor and to afford resistance for protection of the motor in starting and in plugging thereof, of resistance controlling means comprising a switch to effect a predetermined reduction in resistance of the plugging connections prior to slowdown of the motor to zero speed, and further comprising a cold cathode glow discharge tube, said switch having an operating winding and a restraining winding, the latter winding and said tube being in series and having connections with the plugging circuit to be subjected to a potential derived from and proportional to the potential of the plugging circuit.

8. In a controller for electric motors, the combination with means to establish reverse power connections for the motor and to afford resistance for protection of the motor in starting and in plugging thereof, of resistance controlling means comprising a series of electroresponsive switches interlocked to necessitate response thereof in a predetermined sequence, the first switch of the sequence when responding effecting a predetermined reduction in resistance of the plugging circuit and said resistance controlling means further comprising for control of said first switch current conducting means which is subjected to a voltage varying as a function of plugging of the motor and which has the characteristic of changing in degree of conductivity as a function of variation in voltage, the last mentioned means effecting temporary restraint of said first switch against response upon initiation of plugging.

9. In a controller for electric motors, the combination with means to establish reverse power connections for the motor and to afford resistance for protection of the motor in starting and in plugging thereof, of resistance controlling means comprising a series of electroresponsive switches interlocked to necessitate response thereof in a predetermined sequence, the first switch of the sequence when responding effecting a predetermined reduction in resistance of the plugging circuit and said resistance controlling means further comprising for control of said first switch current conducting means which is subjected to a voltage varying as a function of plugging of the motor and which has the characteristic of changing in degree of conductivity as a function of variation in voltage, the last mentioned means effecting temporary restraint of said first switch against response upon initiation of plugging but rendering said first switch free for immediate response for normal starting and acceleration of the controlled motor.

10. In a controller for electric motors, the combination with means to establish reverse power connections for the motor and to afford resistance for protection of the motor in starting and in plugging thereof, of resistance controlling means comprising a series of electroresponsive switches interlocked to necessitate response thereof in a predetermined sequence, the first switch of the sequence when responding effecting a predetermined reduction in resistance of the plugging circuit, and said resistance controlling means further comprising, for temporarily rendering said first switch unresponsive upon initiation of plugging, a circuit including and rendered effective and ineffective by a cold cathode glow discharge tube, the last mentioned circuit being subjected to a voltage derived from and proportional to that of the plugging circuit.

GUY R. RADLEY.
EDWIN W. SEEGER.